July 5, 1938.  W. H. FARR  2,123,101
VEHICLE WHEEL
Filed Dec. 22, 1931

INVENTOR.
WARREN H. FARR
BY
ATTORNEY.

Patented July 5, 1938

2,123,101

UNITED STATES PATENT OFFICE 2,123,101

VEHICLE WHEEL

Warren H. Farr, Detroit, Mich., assignor to Budd Wheel Company, Philadelphia, Pa., a corporation of Pennsylvania Application December 22, 1931, Serial No. 582,522

5 Claims. (Cl. 301—64)

It has been the purpose of my invention to devise a wheel having the appearance of a highly expensive metal spoked or artillery wheel without incurring the expense which the production of a wheel of this type usually entails. To this end I have devised a wheel body pressed out of sheet metal and having structural characteristics bearing a certain degree of similarity to those of an ordinary disc wheel and have shrouded this wheel body in a novel and attractive manner, in order to produce a wheel having the desired appearance at a minimum of expense.

Further objects and advantages of my invention and the manner in which I have attained them will be evident from a reading of the subjoined specification in the light of the attached drawing, in which, Figure 1 is a side elevation of one-half of my improved wheel.

Figure 1:
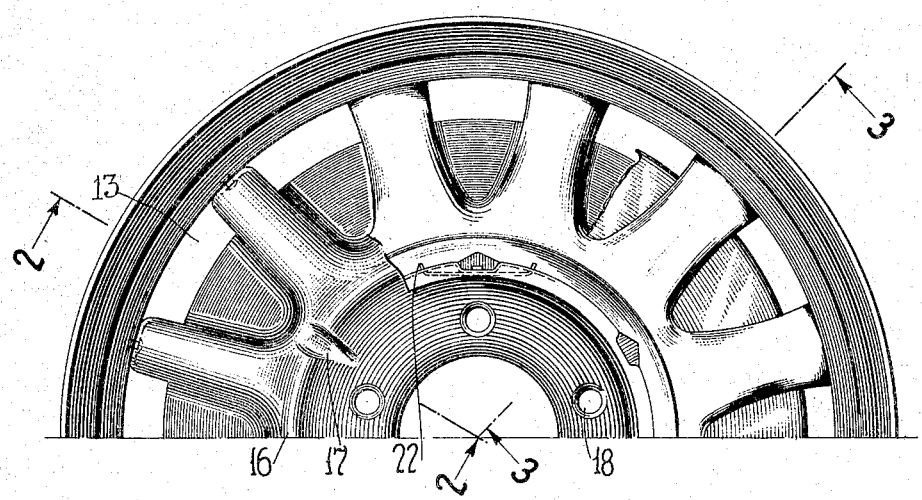

The generally disc-like body constituting the principal portion of my improved wheel is designated by the numeral 10. This disc-like body includes a main body portion 11 having arcuately pressed out portions extending radially thereof to give the disc a spoked appearance. The disc is annularly continuous in its inner zones. However, this annular continuity is terminated in the zone 13 spaced a considerable distance outwardly of the hub and approaching the rim but leaving a certain amount of free space between the terminus of the main body of the disc and the rim member. The individual pressed-out spoked portions extend radially beyond the zone 13 and are provided on their outer radial extremities with axially inturned flanges 14 which support the rim 15 and to which the rim is secured.

Figure 2:
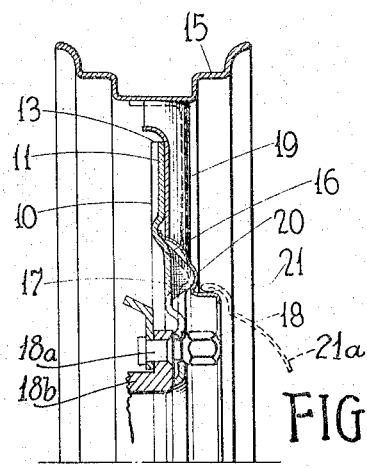
Figure 2 is a cross section on the line 2—2 of Figure 1.
Figure 3:
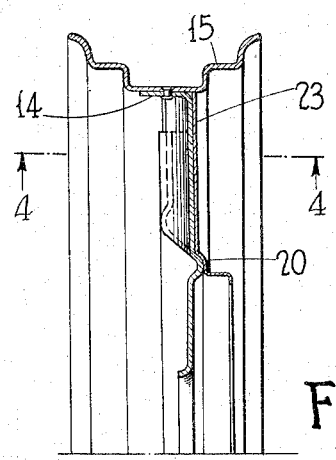
Figure 3 is a cross section on the line 3—3 of Figure 1.
Figure 4:
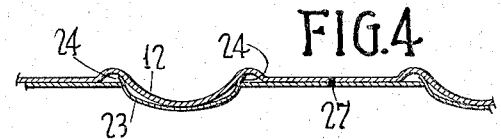
Figure 4 is a cross section on the line 4—4 of Figure 3.
Figure 5:
Figure 5 is a detail view of a shield constituting a part of my shroud structure.

The inner annular portion of the disc-like body includes a conically extending portion 16 which adds a considerable amount of strength to the disc. Intermediate the radially extending center lines of the spoked portions 12, the disc-like body is pressed inwardly as indicated at 17 to afford a number of strengthening ribs in this zone. A plurality of bolt receiving openings 18 are arranged annularly in spaced relationship in the neighborhood of the inner radial extremity of the disc and are adapted to receive bolts by which the disc-like body is secured to a radially extending hub flange, the bolts and hub being conventional and indicated in Figure 2 by the numerals 18a and 18b, respectively.

In order to improve the appearance of the disc-like body, which may be made of metal having an inferior finish, above described a shroud structure 19 is secured thereto. This shroud structure is in the form of a spider and includes an annular central portion conforming in general to the shape of the conically extending portion 16 of the disc-like body. The annular central portion of the shroud is turned axially outwardly at 21 to afford provision for the securement of a cap nut concealing cover (indicated in dotted lines at 21a) thereto through hub cap cover clips 22 which are secured to this flange. A plurality of arms 23 radiate from the annular central portion of the spider and these arms are of curvilinear cross section conforming in general to the shape of the spoked portions of the disc-like body and marginally engaging the side walls of the spoke portions thereof. The shroud arms are provided with rudimentary diagonally flanged portions 24 adjacent their side edges by which they are adapted to be clamped to the disc-like body, as will hereinafter appear. They may be additionally directly welded to the disc-like body if desired. The shroud arms extend throughout the length of the spoked portions of the disc-like body and terminate adjacent the rim 15.

The shrouding arms are preferably formed of light gauge stainless steel or other suitable ornamental material and are locked in place by sector shaped shrouding plates 25 which complete the shrouding structure and may be of the same or different material which may have a similar or a contrasting color with respect to the main body of the shroud structure. The plates 25 conform to the shape of the disc body portions intermediate successive spokes and are adapted to overlap the portions 24 of the shroud arms when secured in face to face relationship to the disc body between successive spoke locations. These plates 25 are curved axially inwardly at 26 and are welded to the disc body at 27 intermediate the spokes in order to secure the shroud in place. The flange 26 simulates the appearance of a brake drum, thus enhancing the beauty of the wheel by avoiding all possible suggestion that the spokes do not have a closed cross section.

It will be seen that when the parts are assembled as illustrated in Figure 1 with the spider shaped shroud arranged with its arms in registry with the spoke portions of the disc-like body and the shrouding plates 25 are secured in assembled relationship with respect to the main body of the shroud structure and disc-like body, the wheel will have a very finished and ornamental appearance. It is also noteworthy that it affords a relatively light and strong structure which may be manufactured inexpensively by reason of its lightness and simplicity.

Modifications will be obvious to those skilled in the art and I do not therefore wish to be limited except by the scope of my sub-joined claims as interpreted in the light of the generic spirit of my invention.

What I claim is:

1. A vehicle wheel including a pressed metal generally disc-like body having radially extending portions thereof pressed into arcuate shape to simulate spokes and having the outermost radial extremities of said spoke portions secured to a rim, the portions of said disc-like body intermediate said spokes terminating radially inwardly of the outermost radial extremities of the spokes and nave, a spider shaped shroud secured to said disc-like body and having its arms overlapping the several spokes, said arms having flanges, and a plurality of metallic sectors occupying the spaces between the respective spokes and secured to the disc body intermediate the spokes and engaging the flanges on said shroud.

2. A vehicle wheel including a generally disc-like body having radially extending portions thereof pressed into arcuate shape to simulate spokes and having the outermost radial extremities of said spoke portions secured to a rim, the portions of said disc-like body intermediate said spokes terminating inwardly of the outermost radial extremities of the spokes, a spider shaped shroud secured to said disc-like body and having its arms overlapping the several spokes, and a plurality of metallic sectors occupying the spaces between the respective spokes and secured to the disc-like body directly, said sectors overlapping flanged portions of the arms of the shroud to secure them in place against the disc-like body.

3. A vehicle wheel including a generally disc-like body having radially extending portions thereof pressed into arcuate shape to simulate spokes and having the outermost radial extremities of said spoke portions secured to a rim, the portions of said disc-like body intermediate said spokes terminating inwardly of the outermost radial extremities of the spokes, a spider shaped shroud secured to said disc-like body and having its arms overlapping the several spokes, and a plurality of metallic sectors occupying the spaces between the respective spokes and secured to the disc-like body directly, said sectors being flanged axially inwardly at their outermost radial extremities to simulate the appearance of a brake drum.

4. A vehicle wheel comprising in combination, a rim and a pressed metal spider supporting said rim from a hub, said spider comprising an annular substantially radially extending bolting-on flange portion, a conically extending nave portion, spokes having their root portions pressed from said nave portion, the main bodies thereof extending therebeyond, said spoke portions being of channel section facing axially and terminating radially outwardly in integral axially extending flange portions, and web portions interconnecting the adjacent side walls of consecutive spokes and extending from the periphery of the nave radially a relatively wide extent approaching nearly the radial extent of the wheel body, and a spider-shaped spoke formed shroud member, the spoke portions of which defining the outer spoke contour between the rim and the radial inner portion of the nave and having edge flanges in the zone of the web portions between the spokes of the main wheel body, and a plurality of substantially triangular shaped plate members engaging the flanged portions of said shroud and secured centrally to the web portions of said wheel body and having axially extending flanges extending beyond the periphery of said web portions.

5. A double disk wheel comprising: an inner load supporting disk and an outer decorative disk rigidly fastened together at their peripheries with their central portions spaced axially from each other, said disks having circumferentially spaced apart registering openings adjacent their peripheries, the wall of the outer disk about each of the openings therein projecting through the corresponding openings in the inner disk, said inner disk adapted to be demountably attached centrally to a wheel hub, and a rim secured to the periphery of the inner disk.

WARREN H. FARR.